United States Patent [19]

Guthrie

[11] Patent Number: 4,536,140
[45] Date of Patent: Aug. 20, 1985

[54] PUMP APPARATUS AND SYSTEM FOR CONTAINING AND METERING UNIFORM PULSES OF A SMALL AMOUNT OF A HAZARDOUS LIQUID

[75] Inventor: Roger T. Guthrie, Pasadena, Md.
[73] Assignee: M&T Chemicals Inc., Woodbridge, N.J.
[21] Appl. No.: 551,447
[22] Filed: Nov. 14, 1983
[51] Int. Cl.³ ............................................. F04B 7/06
[52] U.S. Cl. .................................. 417/500; 118/300; 427/168
[58] Field of Search ......................... 65/60.1; 118/300; 427/168; 417/500, 437

[56] References Cited

U.S. PATENT DOCUMENTS

| | | | |
|---|---|---|---|
| 3,168,872 | 2/1965 | Pinkerton | 417/500 X |
| 3,602,613 | 8/1971 | Gunther et al. | 417/437 |
| 3,687,651 | 8/1972 | Scholes | 65/60.1 X |
| 4,144,362 | 3/1979 | Larkin | 65/60.8 X |
| 4,227,862 | 10/1980 | Andrew et al. | 417/12 |
| 4,389,234 | 6/1983 | Lindner | 65/60.1 |

Primary Examiner—Edward K. Look
Attorney, Agent, or Firm—S. H. Parker; J. Matalon; R. E. Bright

[57] ABSTRACT

A system is provided for delivering controlled quantities of a steady stream of a fluid to an application zone. The system includes a positive displacement pump for producing uniform pulses of small quantities of said fluid. The pump has a piston housing with an elongated bore extending from a first open end to a position proximate a second closed end and a pumping chamber region at said second end. The pumping chamber is provided with a pumping fluid inlet and a pumping fluid outlet. A reciprocating and rotating piston, is positioned for rotational and reciprocating motion within said elongated bore of said piston housing, from a first position in which said piston substantially occupies the space within said pumping chamber and displaces pumping fluid from said pumping chamber to a second position in which said piston is substantially removed from said pumping chamber and draws pumping fluid into said chamber. A barrier fluid inlet means is provided at a position which is between said elongated bore first end and said pumping chamber and adjacent said piston. Barrier fluid is delivered to the elongated bore at a pressure which is greater than the maximum fluid pressure within said pumping chamber, in order to produce a positive pressure differential which precludes migration of pumping fluid from said pumping chamber, along the piston, to said first open end. A mixing chamber is provided for mixing pumped fluid with air. The mixture is delivered to an application zone through an elongated restricted flow conduit, whereby said fluid and said air transform from a pulsed flow at said flow conduit first end to a steady flow at said second end.

9 Claims, 9 Drawing Figures

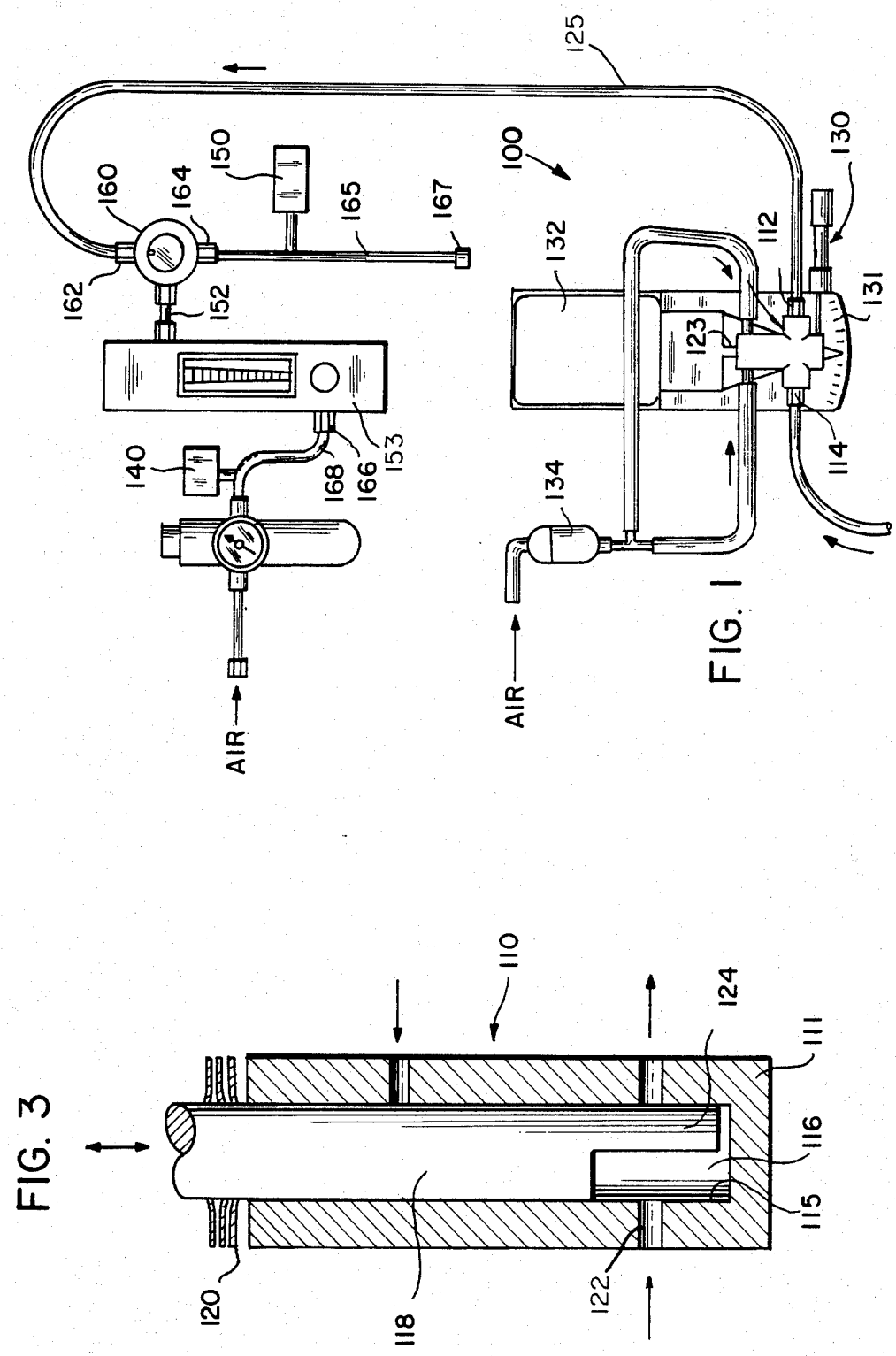

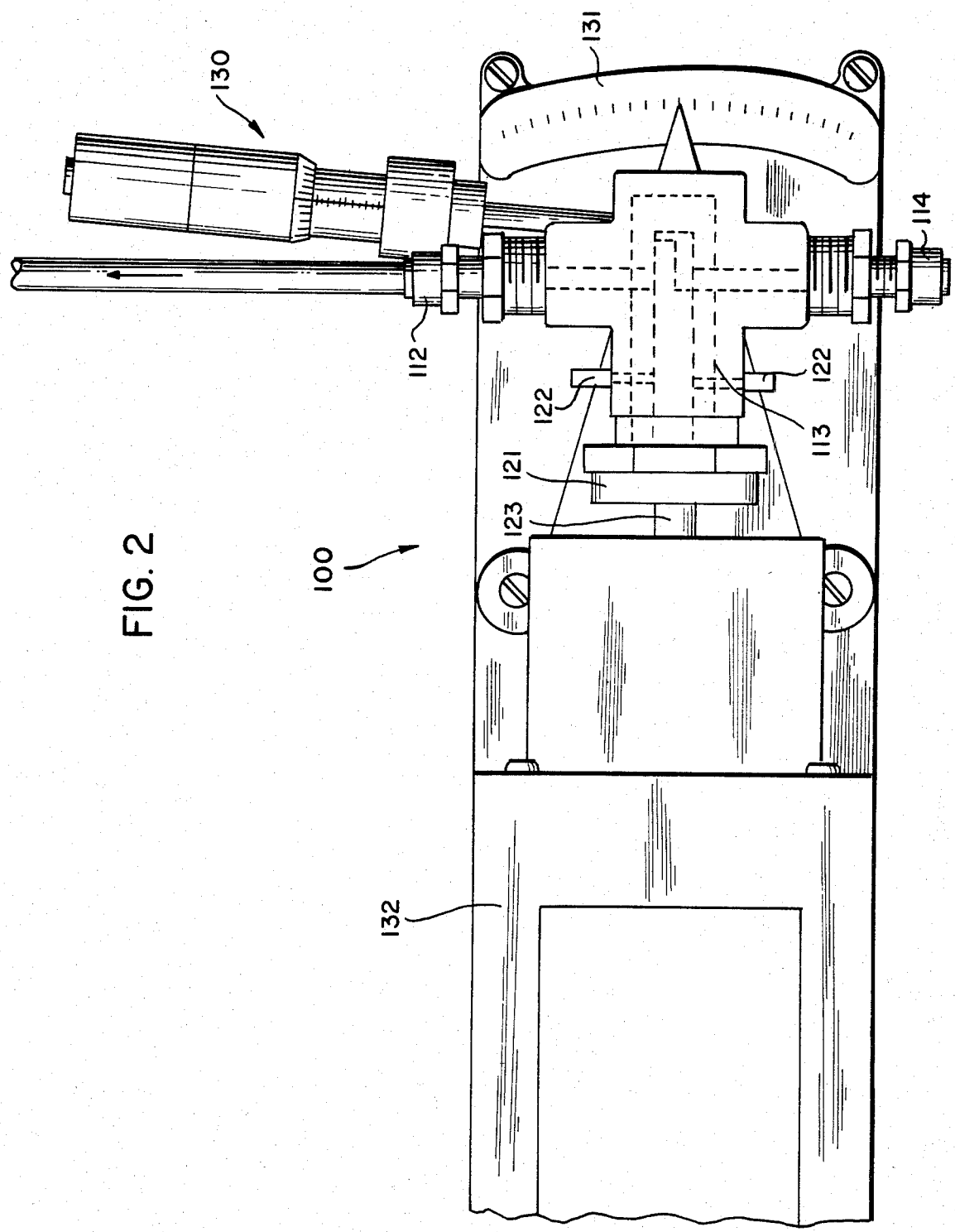

4,536,140

PUMP APPARATUS AND SYSTEM FOR CONTAINING AND METERING UNIFORM PULSES OF A SMALL AMOUNT OF A HAZARDOUS LIQUID

TECHNICAL FIELD

This invention relates to a positive displacement pump for delivering small quantities of liquids to an application device and more particularly to a fluid application system using a reciprocating positive displacement pump and to the protection of components of the pump from adverse interaction with the fluid.

DESCRIPTION OF THE PRIOR ART

One representative pump as well as a discussion of other prior art pumps is found in pending U.S. patent application Ser. No. 385,176, filed June 4, 1982 (M&T case 1358). Although the pump described there overcomes many of the prior art problems, such as the previously encountered inability to deliver consistent levels of material at very low flow rates. It has been found, however, that it is preferable to use a pump which is free of diaphragms due to either the adverse interaction between the fluid being pumped and the material of the diaphragm or possibility due to the diaphragm material exhibiting a use related characteristic variation.

SUMMARY OF THE INVENTION

It has been found that the problems of the prior art can be overcome through the use of a system which includes a specific pump structure and safety mechanisms.

In accordance with the instant invention, a system is provided which includes a positive displacement pump for producing uniform pulses of small quantities of said fluid. The pump has a piston housing with an elongated bore extending from a first open end to a position proximate a second closed end and a pumping chamber region at said second end. The pumping chamber is provided with a pumping fluid inlet and a pumping fluid outlet. A reciprocating and rotating piston, is positioned for rotational and reciprocating motion within said elongated bore of said piston housing, from a first position in which said piston substantially occupies the space within said pumping chamber and displaces pumping fluid from said pumping chamber to a second position in which said piston is substantially removed from said pumping chamber and draws pumping fluid into said chamber. A barrier fluid inlet means is provided at a position which is between said elongated bore first end and said pumping chamber and adjacent said piston. Barrier fluid is delivered to the elongated bore at a pressure which is greater than the maximum fluid pressure within said pumping chamber, in order to produce a positive pressure differential which precludes migration of pumping fluid from said pumping chamber, along the piston, to said first open end.

A mixing chamber is provided for mixing pumped fluid with air. The mixture is delivered to an application zone through an elongated restricted flow conduit, whereby said fluid and said air transform from a pulsed flow at said flow conduit first end to a steady flow at said second end.

BRIEF DESCRIPTION OF THE DRAWINGS

The objects and advantages of the invention will become more apparent and more readily understood when the following detailed description of the invention is read in conjunction with the drawings wherein:

FIG. 1 is a schematic side view of a fluid delivery system in accordance with the present invention.

FIG. 2 is an enlarged view, partly in section, of the pump of FIG. 1;

FIG. 3 is a detailed, fragmentary view of the internal mechanism of the pump of FIG. 2;

DESCRIPTION OF THE INVENTION INCLUDING THE BEST MODE

Figure 5:
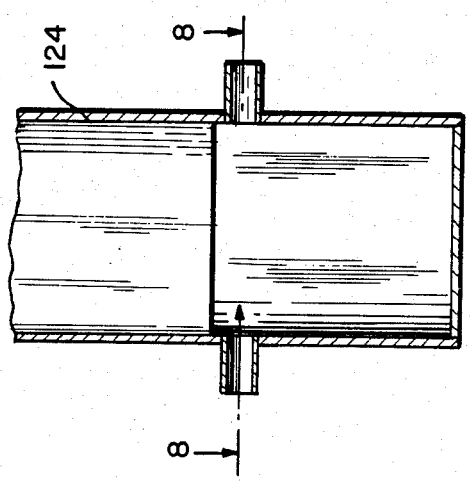
FIG. 5 is a fragmentary view of the device of FIG. 3, showing the piston in the upper portion of its stroke.

The device of the present invention is a system for delivering small quantities of a fluid to an application device in which the fluid is applied to a substrate. In one particular embodiment, the system can be in accordance with the teachings of U.S. Pat. Nos. 4,389,234 and 4,144,362, the subject matter of which is incorporated herein by reference.

FIG. 1 illustrates the overall mechanism which is employed in the present invention. The delivery system includes a pump 100 which transfers the fluid, such as a monobutyltin trichloride containing formulation, to the sight glass, in which it is mixed with air. The air is delivered to the 160 sight glass from a source, not shown, at a pressure which is regulated as well known in the art. If the air pressure falls below a critical lower limit, the air flow sensor 140 shuts of the pump 100 until the required air flow is resumed. It should be noted that the sensor can be positioned upstream or down stream of the rotameter.

The mixing of the air and the fluid in the 160 is critical, since the pump 100 delivers a pulsed fluid flow, and the fluid delivered to the hood or other fluid application device must be uniform. The mixed air and fluid flowing in sight glass combined fluid conduit 165 achieves the level of homogenity which is required at the ultimate point of fluid application.

The fluid flow rate is exactly regulated by means of flow rate adjustment mechanism 130 which can be micrometer or other mechanism as well known in the art.

The pump 100 is provided with a scale 131 which enables the user to set the system at predetermined flow rates. The fluid from the storage drum or other container, not shown, enters the pump 100 through the inlets means 114. The pumped fluid exists through the outlet means 112 and is delivered through the conduit 115 to the sight glass 160. Dry air is delivered to the rotameter from a source, not shown, through a conduit 168, to the rotameter inlet 166. To assure that the pump is in operation only as long as there is a supply of air being delivered at the requisite pressure to the rotameter 153, a pressure sensor 140 can be provided, as previously noted. The sensor activates a transducer which assures the the pump 100 is ON only in conjunction with air. A further safety device which can be provided, is an alarm activating sensor 150 which responds to excessive pressure in outlet conduit 165, as could occur when air dryer malfunction at air source allows moisture to enter the system and react with the pumped fluid, clogging conduit 165 with solid hydrolysis product.

The air-fluid mixture is delivered through the conduit 165, to an application device such as a glass coating hood, not shown. The connector 167 is employed for delivering the combined fluid to the application hood inlet or to any other desired device.

It is seen that system must be capable of delivering controlled quantities of a steady stream of the fluid to the application zone. However, the positive displacement reciprocating pump produces uniform pulse of small quantities of the fluid. The sight glass 160 serves as a mixing chamber for the air and the fluid but does not serve to eliminate the pulsed flow of the pump. The elongated, restricted flow conduit 165, having one end in communication with the mixing chamber outlet and its other end in communication with said fluid application zone, serves to transform the mixed fluid-air fluid from a pulsed flow to a steady flow. The function of the air is predominantly as a carrier and diluent for the fluid and to provide sufficient total fluid volume that a steady state flow can be realized.

It has been found that in the pumping of organotin halide formulations for use in the coating of glass, the design of the pump is extremely critical due to the reactivity of the fluid, particularly with moist air, the extremely low flow rates involved and the tendency of the fluid and/or mixture of air and fluid to behave in unpredictable ways and for reasons which are not readily evident.

The ability to achieve long term, reliable pumping of fluid as required in the system disclosed in U.S. Pat. No. 4,389,234 has been difficult to achieve. The use of a pump which does not require diaphragms or typical valves, has been found to overcome the problems encountered with numerous prior art and innovative pumps. However, the pump, as illustrated in FIG. 1 and FIG. 3, exhibited a shortcoming not typically encountered with other pumps. The combination of the desirable features of other pumps and the absence of problems of the prior art pumps and pumps of the type illustrated in FIG. 3, that is, an optimum device, was achieved by means of providing the pump 100 with a fluid barrier between the pumping chamber 116 and the seal rings 120.

Looking now to the operation of the pump in detail, it is seen that the pump 100 is provided with a body portion or housing 111. Within the pump body portion 113, is a piston assembly, indicated generally as 110. The assembly 110 includes a housing member 111 which is made of a corrosion resistant, high durability material capable of being machined, milled or otherwise provided with high tolerance surfaces for mating with the reciprocating piston 118. Even with the closest of tolerance between the reciprocating piston 118 and the interior cylindrical walls 115 of the piston housing 111, a minute quantity of the fluid which is being pumped can migrate from the pumping chamber to the seal rings 120. Where the fluid is a corrosive material such as a monobutyltin trichloride containing formulation, the minute migration of fluid causes the failure over an unpredicatable period of time of the seal rings 120, which are typically made of a material such as polytetrafluoroethylene or a synthetic rubber. The failure can be due to solvent interaction with the seal material or abrasion of the seals by particles which form on the outside of the pump housing, adjacent the closure 121. The quantity of fluid leakage past the seal rings 120 and past the cap or closure 121 which retains the piston assembly 110 in the piston housing 113, can be so low as to be essentially imperceptible or at least of no consequence. It has been found that upon occasion the reciprocating piston 118 which, like the piston housing 111, can be of a hard by brittle material such as alumina, can seize and crack from ingress of the aforementioned solid particle of hydrolyzate.

As shown in FIG. 3, a fluid inlet 122 can be provided in the upper region of the piston housing, below the end adjacent to the seals 120 and above the region which enters the pumping chamber 116. An extremely small quantity of inert fluid is forced into the region between the body of the reciprocating piston 118 and the interior walls 115 of the piston housing 111. It should be noted that the highly polished surfaces of the reciprocating piston 118 and the piston housing 111 effectively act as a seal. Consequently, the quantity of fluid pumped into the piston housing 111 through the fluid inlet 122 can be on the order of a few ounces per month. The critical factor is that the fluid pressure at the displacement or barrier fluid inlet 122 is greater than the fluid pressure in the piston chamber 116, so that there is a total absence of fluid flow from the piston chamber 116 to the region of the seal rings 120 and a minimum of flow from the fluid inlet 122 to the seal rings 120 and to the pumping chamber 116. The greater the pressure difference between the fluid inlet 122 and the piston chamber 116, the lower the risk of fluid being pumped migrating past the seals 120 to the exterior region 123 of the reciprocating piston 118, but the higher the consumption of barrier fluid and the contamination by the barrier fluid of the fluid being pumped. Although the barrier fluid inlet can include a plurality of ports, the desired result can be attained with a single port. In the event that a plurality of ports are used, it is essential that all of the ports serve as inlets and a continuous flow through inlets and outlets should be avoided since such an arrangment would dramatically increase the consumption of barrier fluid and would necessitate the disposal of barrier fluid contaminated with the fluid being pumped. In those instances where, for example, two inlet ports are used, both ports should be connected to a single source of barrier fluid.

In the case of the fluid being pumped being an organotin such as monobutyltin trichloride or anhydrous tin tetrachloride, the barrier fluid can be a non-detergent oil such as, a lubricating oil; or an organic solvent such as anhydrous methanol; or dry air. It is essential that the barrier fluid be compatible with the fluid being pumped, be present in such low concentration and/or have properties such that no adverse effects are noticed at the application end of the system. Where the pumped fluid is sulfuric anhydride, the barrier fluid can be silicone or fluorocarbon liquids or dry air. In the case of aqueous solutions of radioactive, pathogenic or toxic materials, the barrier fluid can be pure water. When pumping sulfur dioxide, hydrogen sulfide, or phosgene, hydrocarbon oils, air, as well as silicone or fluorocarbon liquids can be employed.

In the case of glass coating systems, the application temperature can be sufficiently high to vaporize the minor quantity of barrier fluid which mixes in the pumping chamber with the fluid being pumped, particularly since it has been found that as little as 1 cc of oil per day can prevent pump failure as compared to identical pumps also handling the same monobutyltin trichloride formulation, which failed in as little as two or three days. The ceramic or ceramic seal of the surfaces of the piston 118 and the interior wall 115 of the piston housing 111, in combination with the positive pressure of the barrier fluid over the fluid being pumped was found to prevent particle formation on the shaft 123 of the piston 118 and consequently provide for the failure free operation of the pump. The barrier fluid reservoir 134 is connected to a source of air at a pressure of about 20 psi in order to provide the required pressure differential.

Figure 4:
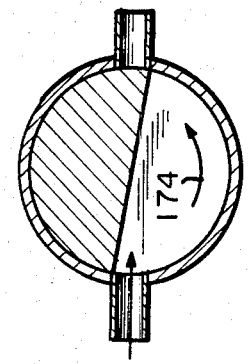
FIG. 4 is a schematic cross-sectional view of the device of FIG. 3 taken along the plane of lines 4—4 of FIG.5.
Figure 6:
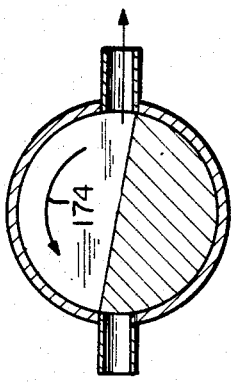
FIG. 6 is a schematic cross-sectional view of the device of FIG. 3 taken along the plane of lines 6—6 of FIG. 7, showing the piston at the bottom of its stroke.
Figure 9:
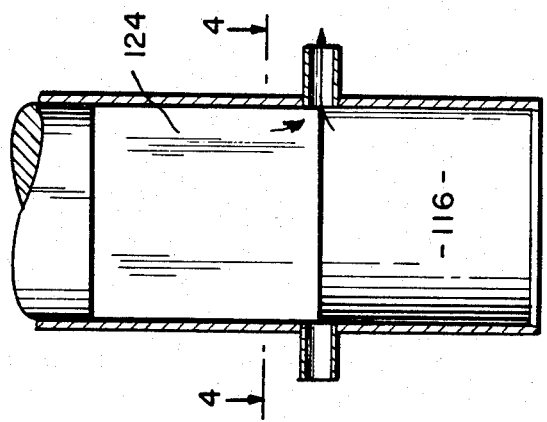
FIG. 9 is a fragmentary view of the device of FIG. 3, showing the piston at the top of its stroke.
Figure 8:
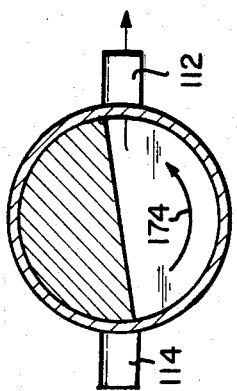
FIG. 8 is a schematic cross-sectional view of the device of FIG. 3 taken along the plane of lines 9—9 of FIG. 9, showing the piston at the top of its stroke.

FIGS. 4, 6 and 8 illustrate the positions of the reciprocating piston relative to the fluid inlet port 114 and the fluid outlet port 112 and the valving action produced during the pumping cycle. FIGS. 5, 6 and 9 illustrate the positions of the reciprocating piston relative to the pumping chamber 116 during the pumping cycle.

Figure 7:
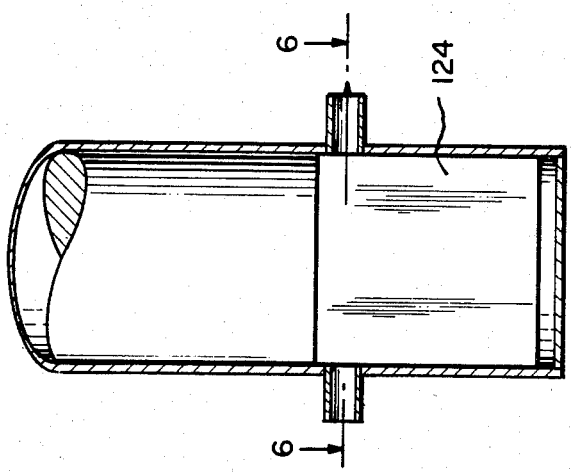
FIG. 7 is a fragmentary view of the device of FIG. 3, showing the piston at the bottom of its stroke.

As illustrated in FIGS. 4 and 5, the piston 118 is at the highest point in its movement and the volume of the pumping chamber 116 is at the maximum. At this point in time the inlet portion 114 is closed and the outlet port 112 is open. The reciprocating piston rotates as indicated by the arrow 174, during which time the piston also descends toward its lower most position. The beginning of the transition between the discharge cycle and the suction cycle is illustrated in FIGS. 6 and 7.

At the end of the discharge portion of the cycle, the fluid outlet closes. As illustrated in FIG. 8, at the end of the suction cycle the continued rotation of the piston 118 in the direction indicated by the arrow 178, results in the closing of the fluid inlet and opening of the fluid outlet as illustrated in FIG. 4. During the piston rotation, the piston also reciprocates, thereby increasing the available space in the pumping chamber during the suction cycle and decreasing the available fluid space during the discharge cycle. Control of the extent of travel of the reciprocating piston is achieved by adjustment of the micrometer 130 which serves to alter the angle between the center line of the motor 132 and the reciprocating piston 118, as well known in the art. The details of the control of the fluid flow rate by the angle adjustment are well known in the prior art and is not a part of the instant invention and consequently is not explained in detail in this disclosure.

| GLOSSARY | |
|---|---|
| Reference Number | Description |
| 100 | pump |
| 110 | piston assembly |
| 112 | outlet connector |
| 113 | pump body portion |
| 114 | inlet connector |
| 115 | interior cylindrical walls |
| 116 | pumping chamber |
| 118 | reciprocating piston |
| 120 | seal rings |
| 121 | pump end closure |
| 122 | displacement fluid inlet |
| 123 | external region of the piston shaft |
| 124 | piston foot |
| 126 | suction flow direction arrow |
| 128 | displacement flow direction arrow |

| -continued | |
|---|---|
| GLOSSARY | |
| Reference Number | Description |
| 130 | flow rate adjustment mechanism |
| 131 | flow rate scale |
| 132 | motor |
| 134 | barrier fluid reservoir |
| 140 | air pressure sensor |
| 150 | air-fluid mixture pressure sensor |
| 152 | sight glass inlet conduit |
| 153 | rotameter |
| 160 | sight glass |
| 162 | sight glass fluid inlet |
| 164 | sight glass fluid outlet |
| 165 | sight glass combined fluid conduit |
| 166 | rotameter inlet |
| 167 | fluid application device inlet connector |
| 168 | air supply conduit |
| 174 | piston rotation arrow |
| 176 | piston rotation arrow |
| 178 | piston rotation arrow |

What is claimed is:

1. A pump apparatus for completely containing and precisely metering uniform pulses of small quantities of a hazardous and reactive fluid comprising:

a unitary piston housing having interior cylindrical walls, said piston housing having an elongated bore extending from a first open end to a position proximate a second closed end, said elongated bore having a pumping chamber region at said second end, a pumping fluid inlet means to said pumping chamber, a pumping fluid outlet means from said pumping chamber, a reciprocating and rotating piston, said piston being positioned in a uniform mating relationship with the interior walls of said piston housing with a close tolerance therebetween during said pumping cycle for reciprocating motion within said elongated bore of said piston housing, from a first position in which said piston substantially occupies the space within said pumping chamber and displaces pumped fluid from said pumping chamber to a second position in which said piston is substantially removed from said pumping chamber and draws pumping fluid into said chamber, a barrier fluid inlet for providing communication between a source of barrier fluid and said elongated bore at a position which is between said elongated bore first and said pumping chamber and adjacent said piston, pressure means for delivering said barrier fluid directly to said elongated bore at a pressure which is greater than the maximum fluid pressure within said pumping chamber, whereby moist air is prevented from leaking into said piston and when pumping fluid is drawn into said chamber, and migration of pumped fluid from said pumping chamber, along the piston, to said first open end is precluded by said barrier fluid.

2. The pump of claim 1, wherein the rotation of said piston produces the required opening and closing of said pumped fluid inlet means to said pumping chamber and said pumped fluid outlet means from said pumping chamber.

3. The apparatus of claim 1 wherein said barrier fluid pressure is about 20 psi.

4. The apparatus of claim 1, further comprising a barrier fluid reservoir in fluid communication with said barrier fluid inlet means and pressure means for maintaining said barrier fluid under a pressure greater than the fluid pressure developed in said pumping chamber.

5. A pump apparatus according to claim 1 further including means for varying the length of the stroke of said piston.

6. An apparatus for delivering controlled quantities of a steady stream of a fluid to an application zone comprising,
- (a) a positive displacement pump for producing uniform pulses of small quantities of said fluid and having a fluid inlet and a fluid outlet;
  said positive displacement pump being a reciprocating pump having
  a piston housing, said piston housing having an elongated bore extending from a first open end to a position proximate a second closed end, said elongated bore having a pumping chamber region at said second end,
  a pumped fluid inlet to said pumping chamber,
  a pumped fluid outlet from said pumping chamber,
  a reciprocating and rotating piston, said piston being positioned for reciprocating motion within said elongated bore of said piston housing, from a first position in which said piston substantially occupies the space within said pumping chamber and displaces pumped fluid from said pumping chamber to a second position in which said piston is substantially removed from said pumping chamber and draws said fluid into said chamber,
  barrier fluid inlet means for providing communication between a source of barrier fluid and said elongated bore at a position which is between said elongated bore first end and said pumping chamber and adjacent said piston,
  pressure means for delivering said barrier fluid to said elongated bore at a pressure which is greater than the maximum fluid pressure within said pumping chamber, wherein a positive pressure differential precludes migration of pumped fluid from said pumping chamber, along the piston, to said first open end,
- (b) a mixing chamber, having a first inlet in communication with pumped fluid outlet, a second inlet in communication with a source of dry air and an outlet;
- (c) a fluid application zone;
- (d) an elongated restricted flow conduit, having a first end in communication with said mixing chamber outlet and a second end in communication with said fluid application zone, whereby said fluid and said air transform from a pulsed flow at said flow conduit first end to a steady flow at said second end.

7. The apparatus of claim 6, wherein the rotation of said piston produces the required opening and closing of said pumped fluid inlet means to said pumping chamber and said pumped fluid outlet means from said pumping chamber.

8. The apparatus of claim 6, further comprising a barrier fluid reservoir in fluid communication with said barrier fluid inlet means and pressure means for maintaining said barrier fluid under a pressure greater than the fluid pressure developed in said pumping chamber.

9. The apparatus of claim 6 wherein a low air-fluid mixture flow rate sensor is provided upstream of said mixing chamber.

* * * * *